United States Patent
Xu et al.

(10) Patent No.: US 10,441,932 B2
(45) Date of Patent: Oct. 15, 2019

(54) APPARATUS FOR VAPOR-LIQUID DISTRIBUTION

(71) Applicant: UOP LLC, Des Plaines, IL (US)

(72) Inventors: Zhanping Xu, Inverness, IL (US); Daniel A. Kauff, Arlington Heights, IL (US); Robert J. Sanger, Mount Prospect, IL (US); Sathit Kulprathipanja, Schaumburg, IL (US); Emadoddin Abbasi, Oak Park, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/015,146

(22) Filed: Jun. 21, 2018

(65) Prior Publication Data
US 2019/0001292 A1  Jan. 3, 2019

Related U.S. Application Data

(60) Provisional application No. 62/526,219, filed on Jun. 28, 2017.

(51) Int. Cl.
*B01J 8/22* (2006.01)
*B01J 8/04* (2006.01)
*B01J 4/00* (2006.01)
*B01J 8/02* (2006.01)

(52) U.S. Cl.
CPC .......... *B01J 8/0492* (2013.01); *B01J 4/001* (2013.01); *B01J 4/004* (2013.01); *B01J 8/025* (2013.01); *B01J 8/0453* (2013.01); *B01J 8/22* (2013.01)

(58) Field of Classification Search
CPC .......... B01J 8/0492; B01J 8/0453; B01J 8/22
USPC ...................................................... 422/220
See application file for complete search history.

(56) References Cited

U.S. PATENT DOCUMENTS

| 5,885,534 | A | * | 3/1999 | Reynolds | .............. B01F 5/0475 422/140 |
| 7,988,928 | B2 | | 8/2011 | Augier et al. | |
| 8,206,657 | B2 | | 6/2012 | Augier et al. | |
| 2004/0086435 | A1 | * | 5/2004 | Boyer | .................. B01D 53/185 422/220 |
| 2007/0145610 | A1 | | 6/2007 | Breivik | |
| 2008/0308460 | A1 | * | 12/2008 | Augier | ............... B01D 19/0042 208/146 |

OTHER PUBLICATIONS

International Search Report and Written Opinion from corresponding PCT Application No. PCT/US2018/038947, dated Sep. 27, 2018.

* cited by examiner

*Primary Examiner* — Huy Tram Nguyen

(57) ABSTRACT

The present invention relates to an apparatus for gas-liquid distribution. More specifically, the present invention relates to a gas-liquid distribution device that may be used in an ionic liquid co-current gas and liquid up-flow reactor designed to distribute gas uniformly across the reactor cross section through restriction orifices on distributors located across the distribution tray.

20 Claims, 1 Drawing Sheet

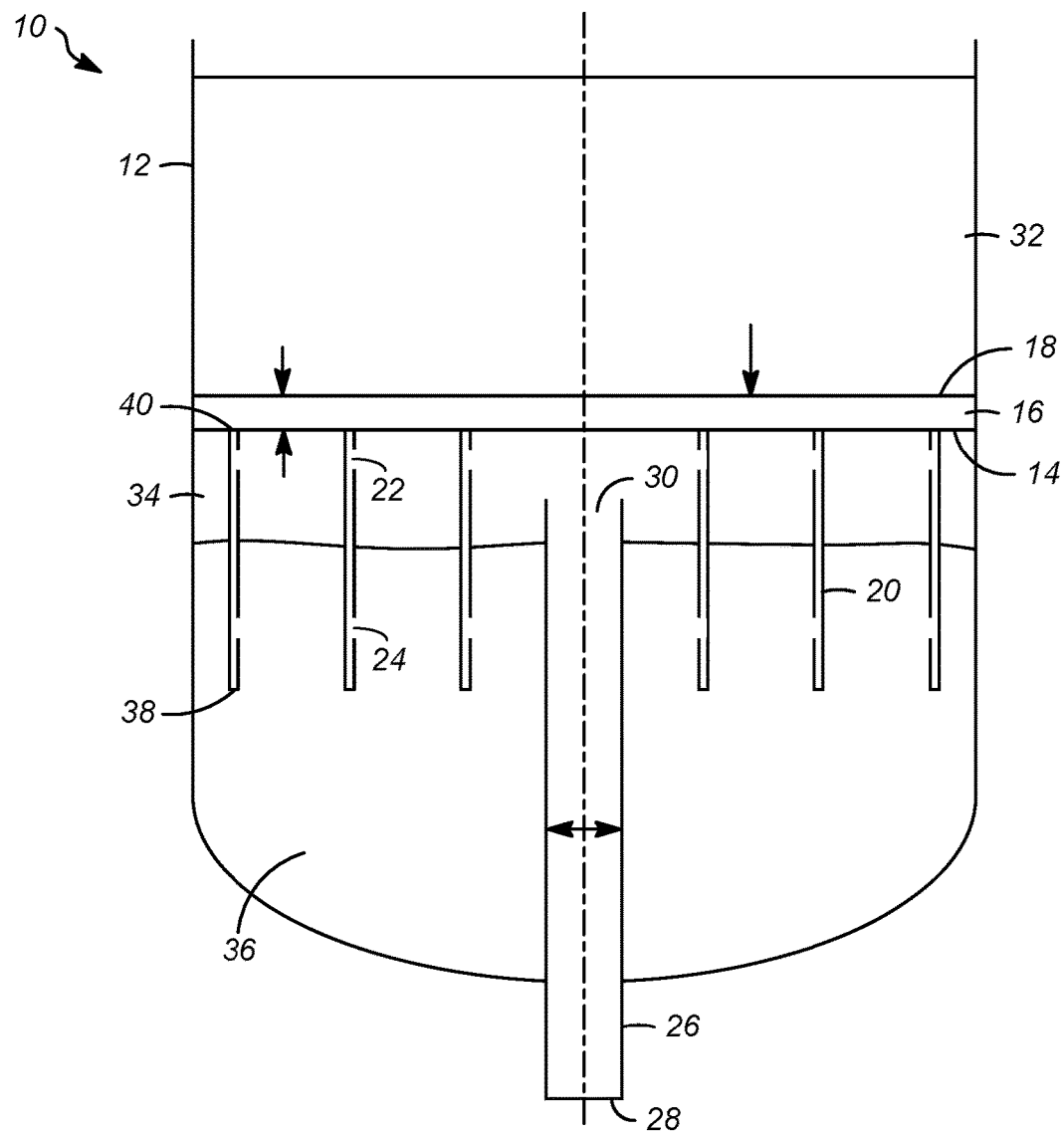

APPARATUS FOR VAPOR-LIQUID DISTRIBUTION

CROSS-REFERENCE TO RELATED APPLICATION

This application claims priority from Provisional Application No. 62/526,219 filed Jun. 28, 2017, the contents of which cited application are hereby incorporated by reference in its entirety.

FIELD

The present invention relates to an apparatus for gas-liquid distribution. More specifically, the present invention relates to a gas-liquid distribution device that may be used in an ionic liquid co-current gas and liquid up-flow reactor designed to distribute gas uniformly across the reactor cross section through restriction orifices on distributors located across the distribution tray.

BACKGROUND

In the co-current gas-liquid upflow reactors, liquid is the continuous phase and gas dispersed phase. It is critical to distribute gas uniformly across the reactor cross section, which is achieved by building a gas chamber under a distribution tray so that gas can be distributed through restriction orifices on distributors located across the distribution tray. Good tray performance requires there to be a stable gas-liquid interface below the tray. When the gas-liquid feed stream is injected into the bottom of reactor, gas bubbles travel upwards and disrupt the gas-liquid interface, which negatively impacts gas distribution in the tray.

SUMMARY

The present invention is a gas-liquid distribution tray that may be used in an ionic liquid co-current gas and liquid up-flow reactor designed to distribute gas uniformly across the reactor cross section through restriction orifices on distributors located across the distribution tray.

A first embodiment of the invention is an apparatus for gas-liquid distribution, comprising a tubular housing; a cylindrical riser having an inlet and an outlet which is affixed to the bottom opening of the tubular housing; a distribution plate affixed to the inside of the tubular housing; a plurality of chimneys affixed to the bottom of the distribution plate wherein each chimney includes a first horizontal opening and a second horizontal opening.

A second embodiment of the invention is an apparatus for gas-liquid distribution, comprising a tubular housing; a cylindrical riser having one inlet and one outlet which is affixed to the bottom opening of the tubular housing; a distribution plate affixed to the inside of the tubular housing; at least 4 chimneys affixed to the bottom of the distribution plate in an even distribution wherein each chimney includes a first horizontal opening and a second horizontal opening.

A third embodiment of the invention is an apparatus for gas-liquid distribution, comprising a tubular housing, wherein the tubular housing includes a gas space and a liquid space wherein the gas space is located above the liquid space; a cylindrical riser having one inlet and one outlet which is affixed to the bottom opening of the tubular housing; a distribution plate affixed to the inside of the tubular housing; a plurality of chimneys affixed to the bottom of the distribution plate in an even distribution wherein each chimney includes a first circular horizontal opening and a second slotted horizontal opening, wherein the first circular horizontal opening is located in the gas space and the second slotted horizontal opening is located in the liquid space, wherein the top half of the chimneys are located in the gas space and the bottom half of the chimneys are located in the liquid space.

In the foregoing, all temperatures are set forth in degrees Celsius and, all parts and percentages are by weight, unless otherwise indicated. Other objects, advantages and applications of the present invention will become apparent to those skilled in the art from the following detailed description and drawing. Additional objects, advantages and novel features of the examples will be set forth in part in the description which follows, and in part will become apparent to those skilled in the art upon examination of the following description and the accompanying drawing or may be learned by production or operation of the examples. The objects and advantages of the concepts may be realized and attained by means of the methodologies, instrumentalities and combinations particularly pointed out in the appended claims.

BRIEF DESCRIPTION OF THE DRAWING

The FIGURE illustrates a gas-liquid distribution device that may be used in an ionic liquid co-current gas and liquid up-flow reactor.

DETAILED DESCRIPTION

The following detailed description is merely exemplary in nature and is not intended to limit the application and uses of the embodiment described. Furthermore, there is no intention to be bound by any theory presented in the preceding background or the following detailed description.

The description of the apparatus of this invention is presented with reference to the attached FIGURE. The FIG. 1s a simplified diagram of the preferred embodiment of this invention and is not intended as an undue limitation on the generally broad scope of the description provided herein and the appended claims. Certain hardware such as valves, pumps, compressors, heat exchangers, instrumentation and controls, have been omitted as not essential to a clear understanding of the invention. The use and application of this hardware is well within the skill of the art.

The various embodiments described herein relate to a gas-liquid distribution tray. As shown in the FIGURE, an apparatus 10 comprises of a tubular housing 12, a riser 26 and a distribution plate 14. Inside of the housing there is a gas space 34 and a liquid space 36. The riser enters the bottom portion of the tubular housing 12 and extends upwards into the gas space 34 and below the distribution plate 14. The riser may be cylindrical and includes a bottom opening 28 and a top opening 30. Gas and liquid flow through the riser 26 and are discharged to the gas space 34. In the example shown in the FIGURE, the riser 26 has one bottom opening 28 and one top opening 30. However, it is contemplated that in other embodiments there may be openings on side of the riser. For example, there may be slots on side of the riser near top for the distribution of at least a portion of the liquid into the gas space 34.

The distribution plate 14 is a horizontal plate affixed to the inside of the housing 12 that includes a plurality of chimneys 20 that are coupled to the distribution plate 14 and located at various locations around the underneath of the distribution plate 14. The chimneys 20 are connected to the bottom of the distribution plate 14 and extend downward into the liquid space 36. In the example shown in the FIGURE, the top half of the chimneys 20 are in the gas space 34 and the bottom half of the chimneys are in the liquid space 36. However, it is contemplated that in other embodiments, the chimneys 20 may be proportioned differently. For example, top 30% of the chimneys 20 may be located in the gas space 34 and the other 70% of the chimneys 20 may be located in the liquid space 36, or vice versa.

In the example shown in the FIGURE, there are 36 chimneys 20 affixed to the bottom of the distribution plate 14. However, it is contemplated that any amount of chimneys 20 may be affixed to the bottom of the distribution plate 14. For example, there will always be at least 4 chimneys located around the distribution plate 14.

In the example shown in the FIGURE, the chimneys are cylindrical and hollow in the inside, shaped like a tube, and pass through the plate 14. This allows the gas located in the gas space 34 and the liquid in the liquid space 36 to enter the chimneys 20 and rise up into the space above the distribution tray 14. In addition to top opening 40 and bottom opening 38, each chimney 20 includes at least 2 horizontal openings. In the example shown in the FIGURE, each chimney 20 includes a first horizontal opening 22 and a second horizontal opening 24. The first opening 22 is exposed to the gas space 34 and the second opening 24 is exposed to the liquid space 36 or gas space if the gas space 34 is expanded downward to or below the opening 24 at high gas rates. The first opening 22 may be circular, so it is shaped like a hole, or it may be shaped like a slot or a triangle. The second opening 24 may be circular, so it is shaped like a hole, or it may be shaped like a slot or a triangle. It is also contemplated that the second opening 24 may be slots located from the bottom of the liquid chimney 20 upwards, so as to facilitate the flow of the gas into the chimney 20 when gas space 34 reaches the slots. As discussed above, the example illustrated in the FIGURE pictures each chimney having 2 horizontal openings each. However, it is contemplated that each chimney may have more than 2 horizontal openings. For example, each chimney may have 5 horizontal openings, and each opening may be a different shape. For example, if the chimney has 5 openings, 4 of the openings may be circular, and the bottom one may be slots. It is also contemplated that each individual chimney may have its own unique combination of openings and shapes of openings.

The gas space 34 should be designed such that the gas-liquid interface be at least 0.5 inches below the first (top) horizontal holes at the lowest operating gas rate for adequate uniform gas distribution. On the other hand, the gas space 34 should be minimized as it does not perform critical functions such as removing containments or facilitating reaction. The variation range of gas spaces for a specific case is determined by the change in gas flow rates, physical properties and total area of horizontal openings on chimneys 20 available for gas flow. The length of the chimneys is mostly determined by the expected variation of gas spaces 34 during operation such that the gas-liquid interface will never reach the bottom of the chimneys. The number and diameter of the chimneys are designed based on the desired distribution points across the reactor cross section and flow resistance through the chimneys. Additional openings may be placed on plate 14 for gas flow if there is little concern on fouling or plugging.

The space above the distribution plate 14 is a liquid space 16 which is in between the distribution plate 14 and a grid 18 for supporting a packed solid bed 32 above. Computational Fluid Dynamics (CFD) simulations show that gas distribution to the packed bed is improved with a liquid space between the distribution plate 14 and the packed bed 32. The packed bed 32 may contain porous ceramic material that captures solids and other contaminants or solid catalyst for promoting desired reactions. The void space between solid particles in section 32 is filled by liquid and dispersed gas bubbles.

While the invention has been described with what are presently considered the preferred embodiments, it is to be understood that the invention is not limited to the disclosed embodiments, but it is intended to cover various modifications and equivalent arrangements included within the scope of the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus for gas-liquid distribution, comprising a tubular housing; a cylindrical riser having an inlet and an outlet which is affixed to the bottom opening of the tubular housing; a distribution plate affixed to the inside of the tubular housing; a plurality of chimneys affixed to the bottom of the distribution plate wherein each chimney includes a first horizontal opening and a second horizontal opening. An embodiment of the invention is one, any or all of prior embodiments in this paragraph up through the first embodiment in this paragraph, wherein there are about 4 to about 500 chimneys affixed to the bottom of the distribution plate. An embodiment of the invention is one, any or all of prior embodiments in this paragraph up through the first embodiment in this paragraph, wherein there are 36 chimneys affixed to the bottom of the distribution plate. An embodiment of the invention is one, any or all of prior embodiments in this paragraph up through the first embodiment in this paragraph, wherein the tubular housing includes a gas space and a liquid space wherein the gas space is located above the liquid space. An embodiment of the invention is one, any or all of prior embodiments in this paragraph up through the first embodiment in this paragraph, wherein the first horizontal opening of the chimney is located in the gas space and the second horizontal opening is located in the liquid space. An embodiment of the invention is one, any or all of prior embodiments in this paragraph up through the first embodiment in this paragraph, wherein both the first and the second horizontal openings of the chimney are located in the gas space. An embodiment of the invention is one, any or all of prior embodiments in this paragraph up through the first embodiment in this paragraph, wherein top half of the chimneys are located in the gas space and bottom half of the chimneys are located in the liquid space. An embodiment of the invention is one, any or all of prior embodiments in this paragraph up through the first embodiment in this paragraph, wherein top 30% of the chimneys are located in the gas space and the rest of the chimneys are located in the liquid space. An embodiment of the invention is one, any or all of prior embodiments in this paragraph up through the first embodiment in this paragraph, wherein top 70% of the chimneys are located in the gas space and the rest of the chimneys are located in the liquid space. An embodiment of the invention is one, any or all of prior embodiments in this paragraph up through the first embodiment in this paragraph, wherein the chimney horizontal openings are circular. An embodiment of the invention is one, any or all of prior embodiments in this paragraph up through the first embodiment in this paragraph, wherein the chimney horizontal openings are slotted. An embodiment of the invention is one, any or all of prior embodiments in this paragraph up through the first embodiment in this paragraph, wherein the first horizontal openings in the chimneys are circular and the second horizontal openings in the chimneys are slotted. An embodiment of the invention is one, any or all of prior embodiments in this paragraph up through the first embodiment in this paragraph, further comprising a second outlet on the cylindrical riser.

A second embodiment of the invention is an apparatus for gas-liquid distribution, comprising; a tubular housing; a cylindrical riser having one inlet and one outlet which is affixed to the bottom opening of the tubular housing; a distribution plate affixed to the inside of the tubular housing; at least 4 chimneys affixed to the bottom of the distribution plate in an even distribution wherein each chimney includes a first horizontal opening and a second horizontal opening. An embodiment of the invention is one, any or all of prior embodiments in this paragraph up through the second embodiment in this paragraph, wherein the tubular housing includes a gas space and a liquid space wherein the gas space is located above the liquid space. An embodiment of the invention is one, any or all of prior embodiments in this paragraph up through the second embodiment in this paragraph, wherein the first horizontal opening of the chimney is located in the gas space and the second horizontal opening is located in the liquid space. An embodiment of the invention is one, any or all of prior embodiments in this paragraph up through the second embodiment in this paragraph, wherein both the first and the second horizontal openings of the chimney are located in the gas space. An embodiment of the invention is one, any or all of prior embodiments in this paragraph up through the second embodiment in this paragraph, wherein the top half of the chimneys are located in the gas space and the bottom half of the chimneys are located in the liquid space. An embodiment of the invention is one, any or all of prior embodiments in this paragraph up through the second embodiment in this paragraph, wherein the chimney horizontal openings are circular. An embodiment of the invention is one, any or all of prior embodiments in this paragraph up through the second embodiment in this paragraph, wherein the chimney horizontal openings are slotted. An embodiment of the invention is one, any or all of prior embodiments in this paragraph up through the second embodiment in this paragraph, wherein the first horizontal openings in the chimneys are circular and the second horizontal openings in the chimneys are slotted. An embodiment of the invention is one, any or all of prior embodiments in this paragraph up through the second embodiment in this paragraph, further comprising a second outlet on the cylindrical riser.

A third embodiment of the invention is an apparatus for gas-liquid distribution, comprising a tubular housing, wherein the tubular housing includes a gas space and a liquid space wherein the gas space is located above the liquid space; a cylindrical riser having one inlet and one outlet which is affixed to the bottom opening of the tubular housing; a distribution plate affixed to the inside of the tubular housing; a plurality of chimneys affixed to the bottom of the distribution plate in an even distribution wherein each chimney includes a first circular horizontal opening and a second slotted horizontal opening, wherein the first circular horizontal opening is located in the gas space and the second slotted horizontal opening is located in the liquid space, wherein top half of the chimneys are located in the gas space and bottom half of the chimneys are located in the liquid space.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. An apparatus for gas-liquid distribution, comprising: a tubular housing;
   a cylindrical riser having an inlet and an outlet which is affixed to the bottom opening of the tubular housing;
   a distribution plate affixed to the inside of the tubular housing; and
   a plurality of chimneys affixed to the bottom of the distribution plate wherein each chimney includes a first horizontal opening and a second horizontal opening.

2. The apparatus of claim 1, wherein there are about 4 to about 500 chimneys affixed to the bottom of the distribution plate.

3. The apparatus of claim 1, wherein there are 36 chimneys affixed to the bottom of the distribution plate.

4. The apparatus of claim 1, wherein the tubular housing includes a gas space and a liquid space wherein the gas space is located above the liquid space.

5. The apparatus of claim 1, wherein the cylindrical riser outlet is located in the gas space.

6. The apparatus of claim 5, wherein the first horizontal opening of the chimney is located in the gas space and the second horizontal opening is located in the liquid space.

7. The apparatus of claim 5, wherein both of the first and the second horizontal openings of the chimney are located in the gas space.

8. The apparatus of claim 5, wherein top 30% of the chimneys is located in the gas space and the rest of the chimneys is located in the liquid space.

9. The apparatus of claim 5, wherein top 70% of the chimneys is located in the gas space and the rest in the liquid space.

10. The apparatus of claim 1, wherein the first horizontal openings in the chimneys are circular and the second horizontal openings in the chimneys are slotted.

11. The apparatus of claim 1, further comprising a second outlet on the cylindrical riser side wall.

12. An apparatus for gas-liquid distribution, comprising:
    a tubular housing;
    a cylindrical riser having one inlet and one outlet which is affixed to the bottom opening of the tubular housing;
    a distribution plate affixed to the inside of the tubular housing; and
    at least 4 chimneys affixed to the bottom of the distribution plate in an even distribution wherein each chimney includes a first horizontal opening and a second horizontal opening.

13. The apparatus of claim 12, wherein the tubular housing includes a gas space and a liquid space wherein the gas space is located above the liquid space.

14. The apparatus of claim 12, wherein the first horizontal opening of the chimney is located in the gas space and the second horizontal opening is located in the liquid space.

15. The apparatus of claim 12, wherein top half of the chimneys is located in the gas space and bottom half of the chimneys is located in the liquid space.

16. The apparatus of claim 12, wherein the chimney horizontal openings are circular.

17. The apparatus of claim 12, wherein the chimney horizontal openings are slotted.

18. The apparatus of claim 12, wherein the first horizontal openings in the chimneys are circular and the second horizontal openings in the chimneys are slotted.

19. An apparatus for gas-liquid distribution, comprising:
a tubular housing, wherein the tubular housing includes a gas space and a liquid space wherein the gas space is located above the liquid space;
a cylindrical riser having one inlet and one outlet which is affixed to the bottom opening of the tubular housing;
a distribution plate affixed to the inside of the tubular housing; and
a plurality of chimneys affixed to the bottom of the distribution plate in an even distribution wherein each chimney includes a first circular horizontal opening and a second slotted horizontal opening, wherein the first circular horizontal opening is located in the gas space and the second slotted horizontal opening is located in the liquid space, wherein top half of the chimneys is located in the gas space and bottom half of the chimneys is located in the liquid space.

20. The apparatus of claim 19, wherein an ionic liquid and gas flow up co-currently through a solid bed for containment removal or reaction.

* * * * *